March 31. 1925. 1,531,597
F. E. CROTTO
LINER FOR CABLE ENGAGING TOOLS
Filed Dec. 3, 1923
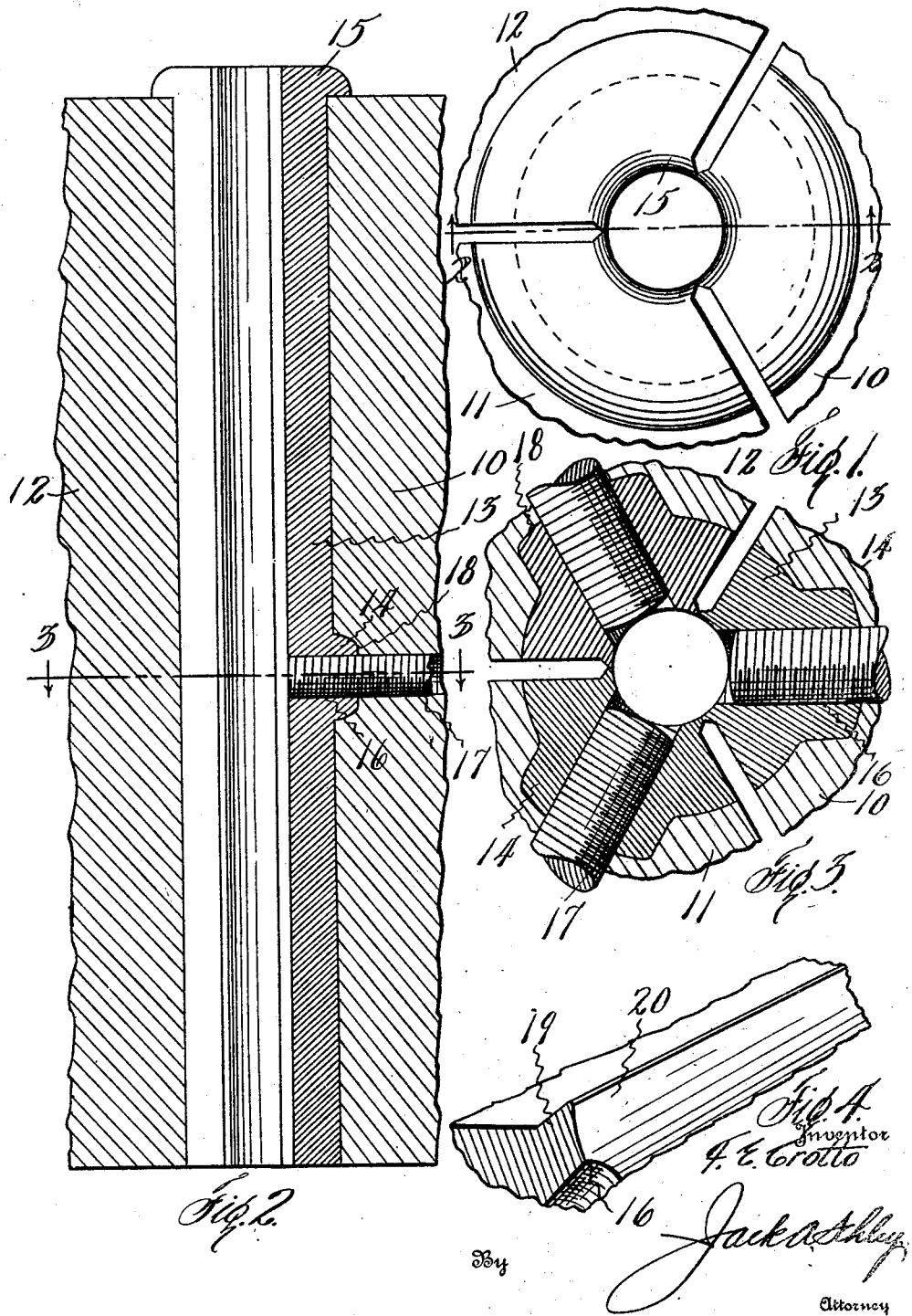

Patented Mar. 31, 1925.

1,531,597

UNITED STATES PATENT OFFICE.

FRANK E. CROTTO, OF TULSA, OKLAHOMA, ASSIGNOR TO WESTERN SUPPLY COMPANY, OF TULSA, OKLAHOMA, A CORPORATION OF OKLAHOMA.

LINER FOR CABLE-ENGAGING TOOLS.

Application filed December 3, 1923. Serial No. 678,366.

*To all whom it may concern:*

Be it known that I, FRANK E. CROTTO, citizen of the United States of America, residing at Tulsa, in the county of Tulsa and State of Oklahoma, have invented certain new and useful Improvements in Liners for Cable-Engaging Tools, of which the following is a specification.

This invention relates to new and useful improvements in liners for cable engaging tools.

The invention has particularly to do with cable gripping tools such as are used in drilling wells. The gripping faces of such tools, are worn by the wire cable, particularly where the cable slips through the tool and abraids the gripping faces. Where the tool is divided into two or more sectors, the radius of the curved faces is constantly increased by the wear and the diameter of the opening in which cable is received, is thus enlarged, whereby the tool gradually loses its gripping efficiency and makes replacing of the parts necessary at frequent intervals. Further, such curved faces do not wear evenly and the cable opening thus soon becomes elliptical.

The object of my invention is to provide liners for the gripping faces of cable gripping tools arranged to space the sectors of the tool apart whereby the wear is compensated by an inward radial adjustment of the sectors, thus maintaining an efficient gripping structure until the liners are worn out, as well as preserving substantially the same diameter for the cable opening.

A further object is to provide liners having amplified gripping faces which present increased wearing areas, thus making for more even wear and efficiency in gripping the cable.

An important object is to provide the liners with vertical space ribs contacting and spacing the sectors apart and arranged to automatically adjust the sectors inwardly as the faces of the liners wear, whereby a circular and effective wear surface will at all times be presented.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a plan view of the gripping portion of a cable tool equipped with liners constructed in accordance with my invention, Fig. 2 is a vertical sectional view on the line 2—2 of Fig. 1, Fig. 3 is an enlarged cross-sectional view on the line 3—3 of Fig. 2, and Fig. 4 is a detail of one of the liners.

In the drawings the numeral 10 designates one of the sectors of a cable gripping tool which has like sectors 11 and 12, respectively. The three sectors may form part of a wire line clamp or any other tool and the invention is applicable to any cable tool having two or more cable gripping faces.

It is customary to provide such sectors with liners or slips, but such terminate flush with the vertical edges of the sectors and when the cable is clamped the sectors are brought together. In carrying out the invention I provide a liner 13 for each sector having a boss 14 at its central portion and an outwardly directed arcuate flange 15 at its upper. Each boss has a screw hole 16 for receiving a screw 17 threaded through the sector.

Each liner is seated in the curved face of the sector which is provided with a seat 18 for the boss, while the flange 15 overhangs the top of the sector. This is the method and structure now commonly employed and it will be seen that while the liners may be replaced, wear will increase their curved gripping faces, thus increasing the radius as well as the diameter of the cable hole formed by the liners.

The invention resides in providing extensions at each vertical edge of each liner, which extensions contact and hold the sectors apart, but present a continuous gripping face. The extensions are formed to compensate for the wear on the faces of liners, whereby substantially the same radius and diameter are maintained. As exemplifying the invention, I have illustrated the liners 13 as provided with ribs 19 along their vertical edges. Each rib has its face 20 (Fig. 4) contiguous to the face of the liner and on the same radius. The rear side of each rib is cut back at such an angle as to recede from the vertical edge proportionately to the wear of the gripping surface of the liner.

When the sectors are swung together or inwardly, the vertical edges of adjacent ribs 19 engage, whereby the sectors and liners are spaced apart, but a continuous gripping face is presented. As the faces of the liners wear the receding sides of the ribs will automatically reduce the width of the faces of the liners as well as reducing the projection of the ribs, whereby the sectors and liners will swing close together thus preserving the radius and diameter and making for even wear. After the ribs are worn off, the liners can still be used for the period ordinarily obtained, before replacement becomes necessary.

Any means for accomplishing the same may be employed and all such as come within the scope of the appended claims, are included herein.

What I claim is:

1. In a cable gripping tool, the combination with a plurality of gripping sectors, of means forming part of the gripping surfaces of said sectors for spacing said sectors apart, said means being adapted to wear and adjust the sectors inwardly to compensate said wear.

2. In a cable gripping tool, the combination with a plurality of gripping sectors, of liners mounted on the inner faces of the sector for gripping a cable, and means on the vertical edges of the liners for spacing the sectors apart and arranged to permit the sectors to approach each other as the faces of the liners wear, whereby a substantially constant radius for the liner faces is maintained.

3. In a cable gripping tool, the combination with a plurality of gripping sectors, liners mounted on the inner faces of the sectors for gripping a cable, and means on the vertical edges of the liners contiguous to the faces of the liners for spacing the sectors apart and arranged to permit the sectors to approach each other as the faces of the liners wear, whereby a substantially constant radius for the faces of the liners is maintained.

4. In a cable gripping tool, the combination with a plurality of gripping sectors, of liners mounted on the inner faces of the sectors for gripping a cable, and extensions on the vertical edges of the liners having their rear sides shaped to reduce the projection of the extensions proportionate to wear of the faces of the liners, said extensions spacing the sectors apart and automatically adjusting the sectors toward each other as the faces of the liners wear.

5. In a cable gripping tool, the combination with a plurality of gripping sectors, of liners mounted on the inner faces of the sectors for gripping a cable, and ribs on the vertical edges of the liners having their rear sides shaped to reduce the projections of the ribs proportionate to wear of the faces of the liners, said ribs spacing the sectors apart and automatically adjusting the sectors toward each other as the faces of the liners wear.

6. A liner for a cable gripping tool having ribs along its longitudinal edges contiguous to its face, said ribs having their rear sides receding from their vertical edges proportionate to wear on the faces of the liner and said ribs.

In testimony whereof I affix my signature.

FRANK E. CROTTO.